Sept. 8, 1970  R. A. W. HILL  3,527,081
DIFFERENTIAL SCANNING CALORIMETER Filed Feb. 23, 1966

INVENTOR
ROYSTON ARTHUR WALTER HILL
BY Cushman, Darby & Cushman
ATTORNEYS

INVENTOR
ROYSTON ARTHUR WALTER HILL

BY Cushman, Darby & Cushman
ATTORNEYS

United States Patent Office 3,527,081
Patented Sept. 8, 1970

3,527,081
DIFFERENTIAL SCANNING CALORIMETER
Royston Arthur Walter Hill, West Kilbride, Scotland, assignor to Imperial Chemical Industries Limited, London, England, a corporation of Great Britain
Filed Feb. 23, 1966, Ser. No. 529,496
Claims priority, application Great Britain, Mar. 10, 1965, 10,212/65
Int. Cl. G01n 25/00
U.S. Cl. 73—15
20 Claims

ABSTRACT OF THE DISCLOSURE

A differential scanning calorimeter whereby both a sample and a reference material are heated by a scanning heater so that the temperatures of the sample and the reference are both varied over a given range and a source of focused radiation is utilized to differentially heat the sample and the reference to maintain both at the same time temperature so that the power used by the source of focused radiation relates to the calories evolved or absorbed by the sample. A source of radiation can also be used as the scanning heater and the use of a source of radiation to differentially heat the sample and reference instead of heating by electrical wires results in a device which is cheap, rugged and simple to manufacture.

This invention relates to a differential scanning calorimeter for measurement of the heat change associated with any transition of a substance occurring when the temperature of the substance is varied over a range of temperature. The instrument can, for example, be used to measure heat of fusion or reaction and for preparing general thermal analyses. It is especially applicable to the measurement of heat changes in very small quantities of substance.

In differential scanning colorimetry the sample substance and an inert reference are scanned through a temperature range and the heat evolved or absorbed by the sample during a transition is measured. Generally, during scanning the sample and reference are heated symmetrically so as to maintain the temperatures substantially equal and any heat change in the sample compared to the reference is obtained by measuring the power required to be applied to maintain the temperatures equal and integrating this measurement over the transition interval.

One known differential scanning calorimeter operating on the above principle comprises holding means for the sample and reference, scanning heating means for symmetrical variation of the temperature of the sample and reference, adjustable control heating means for variable differential heating of the sample and reference, and temperature sensitive means, responsive to the difference in temperature of the sample and reference, arranged to effect variation of said differential heating so as to minimise said temperature difference. The variation of the control heating gives a record of the difference in power required to maintain sample and reference at the same temperature. Hereinafter, reference to a calorimeter of the kind described has reference to the aforedescribed kind of calorimeter.

In previous calorimeters of the kind described the scanning and control heaters were electrical resistance elements. The control heating element for small samples was required to be of very fine wire and was consequently liable to be damaged during ordinary manipulation of the sample and also by spillage of corrosive samples on the wire.

An object of the present invention is the provision of a differential scanning calorimeter of the aforedescribed kind without the need for readily rupturable wires adjacent to the sample substance.

A differential scanning calorimeter of the kind described in accordance with the present invention comprises as its control heating means a source of focussed radiation arranged to transmit radiation towards the sample and reference, and means to vary the relative amounts of the radiation reaching said sample and reference. This variation in radiation is in operation readily calibrated at any temperature within the overall scanning range against a known energy input, which may be an electrical impulse or a known latent heat.

The use of such heating means enables delicate electrical wiring adjacent to the sample to be eliminated and facilitates the use of relatively robust sample holding means and temperature responsive means which are not readily corroded and can be easily cleaned.

The radiation varying means may comprise means to block out differentially all or part of the heat radiation to the sample or reference but it is more convenient if the holding means holds the sample and reference side by side and means are provided to vary the relative radiation thereto by effecting relative deflection of the radiation source and the sample. This deflection is readily effected by pivotally mounting the radiation source and linking it to the temperature sensitive means so that it is pivotally moved in accordance with the temperature difference of sample and reference.

A convenient source of focussed radiation is a projection lamp which may be spaced from the sample holding means a distance such that the desired area is illuminated.

The sample and reference holding means are conveniently identical metal blocks mounted side by side to present coplanar faces to the radiation beam, but which are electrically and thermally isolated. Although it is not absolutely essential for the reference block to provide accommodation for an inert reference substance to simulate the test sample, it is preferred that it should do so since, in addition to any contribution to the experiment accuracy, it enables the blocks to be used interchangeably. The size of the blocks can be readily varied to suit the sample size and the accuracy of measurement required.

In a preferred form the scanning heating means also comprise a source of radiation which for convenience may also be a projection lamp. The intensity of the scanning radiation will, however, be usually much greater than the control radiation. In this form the amount of electrical wiring adjacent to the sample is still further reduced. Scanning may be effected by controlled variation of the lamp current. To facilitate symmetrical heating of sample and reference, coarse adjustment may be effected by relative movement of the lamp and sample and fine adjustment may be achieved by differential interception of the radiation from the lamp.

The temperature sensitive means preferably comprises thermocouple circuits which generate an EMF proportional to the temperature difference between the sample and reference, which EMF may be amplified and fed to a strip chart recording potentiometer whose recording needle is coupled to the control heating means to effect variation of the radiation in the sense required to minimise the temperature difference of the sample and reference. The chart record gives an indication of the power required to compensate for the difference in energy received respectively by the sample and reference.

In order to further illustrate the invention a preferred embodiment will now be particularly described by way of example with reference to the accompanying drawings in which.

Figure 1:
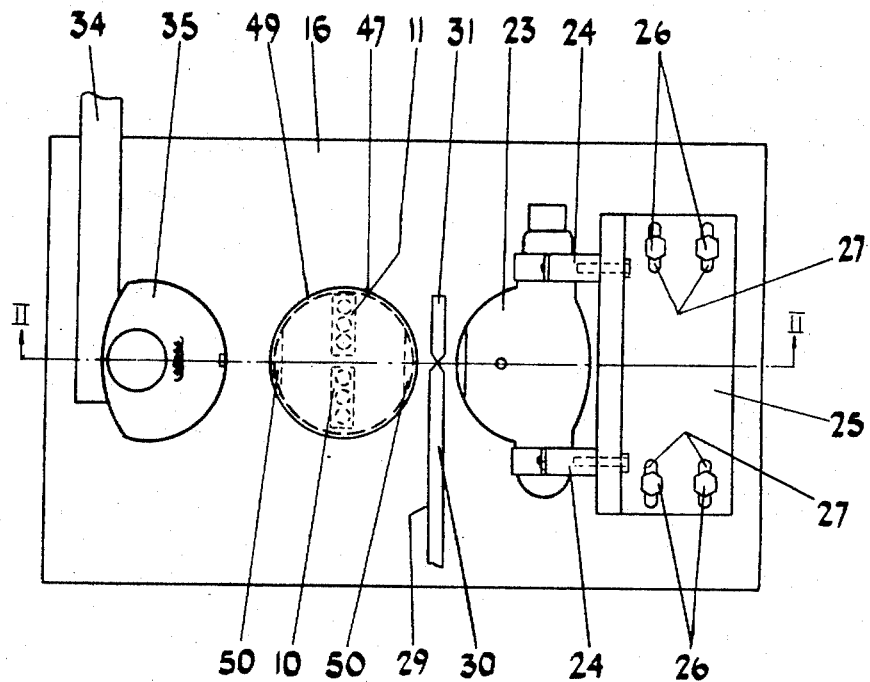
FIG. 1 is a diagrammatic plan view of the embodiment.
Figure 2:
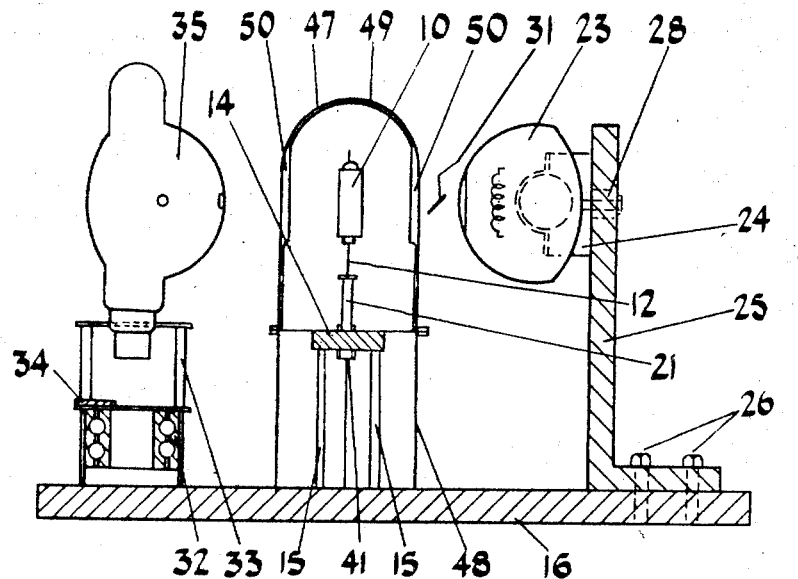
FIG. 2 is a diagrammatic part sectional elevation on the line II–II of FIG. 1.

In the embodiment, two identical metal (Duralumin) blocks 10, 11 are supported by copper wires 12, 13 on a metal plate 14 which is mounted on pillars 15 on a baseplate 16. The blocks 10, 11 are attached to wires 12, 13 by means of two brass screws 17, 18, the heads of which are connected by brazing to a loop of constantan wire 19. The blocks are held in position by a plastic strip 20 surrounding the wires 12, 13 and attached by metal pillars 21 to the plate 14. The metal blocks 10, 11 have holes 22 bored therein to accommodate tubular sample containers and calibration heating equipment. The sample containers may be of metal, quartz or glass and are commonly of stainless steel or borosilicate glass, according to the nature and chemical reactivity of the samples. The blocks 10, 11 are encased in a dome-shaped glass cover 47 which is flanged to a tubular metal support 48 mounted on the baseplate 16. The glass cover 47 is lined with a radiation reflecting lining of copper foil 49 which is formed with windows 50 to permit the passage of radiant heat to the blocks 10, 11.

A projection lamp 23 for heat scanning is attached by two clips 24 to a bracket 25 mounted by set-screws 26 on the baseplate 16. To facilitate heat balancing of the blocks the lamp is mounted so that its filament is vertical. The bracket 25 is formed with elongated holes 27 to accommodate the set-screws 26 and to provide for horizontal adjustment of the lamp 23 and with elongated holes 28 to hold the clips 24 and to provide for vertical adjustment of the lamp.

A rotatable butterfly stop 29 is interposed between the lamp 23 and the blocks 10, 11 and is operable to provide fine adjustment of the heat balance of the blocks. The stop 29 comprises an elongated metal strip twisted so that two portions 30 and 31 are in perpendicular planes, and is mounted so that the position of twist is approximately aligned with the space between the blocks and the centre of the lamp filament.

Figure 3:
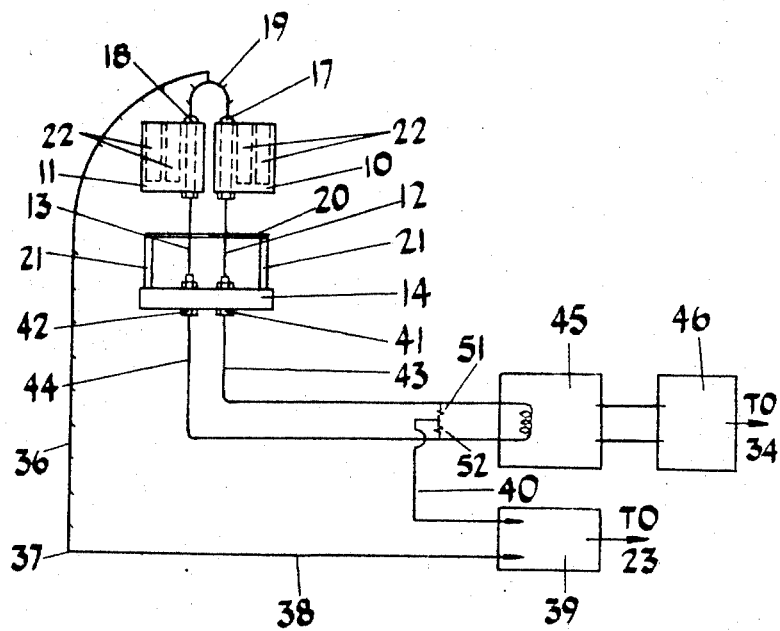
FIG. 3 is a view of the sample and reference holding blocks of the embodiment, viewed from the side, showing the electrical wiring schematically.

Also mounted on the baseplate 16 is a bearing 32 in which a lampholder 33 is journalled to provide for pivotal movement of the lampholder on the baseplate 16. Attached to the lampholder is a lever 34 which is mechanically coupled to the recording needle of a strip chart recording potentiometer 46 (FIG. 3). Fitted in the lampholder is a control projection lamp 35 which is sufficiently spaced from blocks 10, 11 and whose projection area is stopped down sufficiently to achieve a substantially uniform illumination of the blocks. The lamp mounting position is adjusted so that the blocks 10, 11 have equal areas illuminated when the potentiometer needle is at the mid-point of the recording chart.

The mid-point of the loop 19 is connected by constantan wire 36 to a cold junction 37 which is joined by copper wire 38 to scanning control potentiometer 39 to which the wires 12, 13 are also attached through two identical resistors 51 and 52 respectively and a wire 40. This circuit arrangement permits the same thermojunctions to be used both for temperature difference letection and for detection of the average temperature for scanning. The control potentiometer 39 measures the EMF between the wires 38 and 40 and in operation varies the current of lamp 23 to vary temperature of blocks 10 and 11 as required to maintain a predetermined variation in this EMF. For this purpose this EMF is compared with a varying reference EMF and controlled in accordance therewith by measuring the EMF difference and varying the current in the lamp 23 in accordance wtih an amplified EMF difference output so as to minimise the EMF difference.

The copper wires 12, 13 are mounted on the plate 14 by means of screws 41, 42 which extend through the plate 14 and are in good thermal contact therewith but are electrically insulated therefrom. The plate 14 thus acts as a heat sink for the wires 12, 13. The screws 41, 42 are connected by leads, 43, 44 to a magnetic amplifier 45. EMF measured over the leads 43, 44 give a measure of the difference in temperature of the blocks 10 and 11. In operation the output of the amplifier is connected to a strip chart recording potentiometer 46 whose needle is coupled to the lever 34 for varying the control lamp 35 so as to rotate the lamp 35 in the direction required to reduce the temperature difference between the blocks 10 and 11.

In operation the position of lamp 23 and the setting of the stop 29 are adjusted so that the blocks 10, 11 will be range. This may involve readjustment of the stop 29 during scanning. The control lamp 35 and the recording potentiometer 46 are adjusted so that the needle is approximately centrally on the chart when the blocks are being evenly illuminated by lamp 35. A test sample is placed in a hole 22 in one block and an inert reference sample is placed in a hole 22 in the other. The current in lamp 23 is varied to vary the temperature of the sample and reference through the scanning range. A graph of the differential power required to maintain the sample and reference at equal temperature is traced on the chart and shows peaks at the transition temperatures. The area of the peaks gives a measure of the energy involved in the transition. The calorimeter is calibrated for quantitative energy measurement by the use of a substance having a known transition energy or by placing a resistance in a hole 22 in the block and passing a measured electrical impulse through it.

For measurements on samples down to 1.0 milligram, Duralumin blocks (10, 11) 1.5 x 1.3 cm. square and 0.5 cm. thick, a heating lamp 23 of up to 50 watts dissipation and 3 cm. focal length, spaced from the blocks 10, 11 a distance of 5 cm. and a control lamp of up to 20 watts dissipation and a focal length of 3 cm. spaced a distance of 5 cm. from the block, have been found to be convenient.

In a modification of the apparatus which gives more accurate heat measurement, wires 36 and 40 are disconnected from the block circuit and connected to a small thermojunction placed just below the blocks, but in the beam of lamp 23, so that the heat intensity of this lamp, although still under control, is not disturbed by a heat change in the sample.

This modification avoids an error to which all scanning calorimeters with tight control of average block temperature are susceptible, and which arises because variation in intensity of the heat from lamp 23 does not generally affect the blocks equally.

What I claim is:

1. A differential scanning calorimeter comprising holding means for sample and reference, scanning heating means for symmetrical variation of the temperature of the sample and reference, adjustable control heating means for variable differential heating of the sample and reference, and temeprature sensitive means, responsive to the difference in temperature of the sample and reference, arranged to effect variation of said differential heating so as to minimise said temperature difference, said control heating means comprising a source of focussed radiation arranged to transmit radiation towards the sample and reference, and means to vary the relative amounts of the radiation reaching said sample and reference, said means to vary the radiation comprising linking means connecting said temperature sensitive means to said radiation source and adapted to effect relative deflection of said source in accordance with the temperature difference between said sample and said reference.

2. A calorimeter as claimed in claim 1 wherein the holding means holds the sample and reference side by side.

3. A calorimeter as claimed in claim 2 wherein the radiation source is pivotally mounted.

4. A calorimeter as claimed in claim 1 wherein the sample and reference holding means comprises substantially identical electrically and thermally isolated metal blocks mounted side by side to present co-planar faces to the radiation beam.

5. A calorimeter as claimed in claim 4 wherein the block for holding the reference provides accommodation for an inert reference substance to simulate the test sample.

6. A calorimeter as claimed in claim 4 wherein the metal blocks are encased in a transparent cover.

7. A calorimeter as claimed in claim 6 wherein the transparent cover is lined with a radiation reflecting lining provided with windows to permit the passage of radiation to the blocks.

8. A calorimeter as claimed in claim 7 wherein the source of focussed radiation comprises a projection lamp.

9. A calorimeter as claimed in claim 8 wherein the scanning heating means comprises a source of radiation.

10. A calorimeter as claimed in claim 9 wherein the source compirsing the scanning heat means of radiation is a projection lamp.

11. A calorimeter as claimed in claim 10 wherein the lamp is mounted with its filament vertical.

12. A calorimeter as claimed in claim 10 comprising means to vary the lamp current to effect scanning.

13. A calorimeter as claimed in claim 12 wherein the lamp and sample are relatively movable to effect coarse adjustment of the symmetrical heating of sample and reference.

14. A calorimeter as claimed in claim 13 comprising interception means to intercept the radiation from the lamp differential to the sample and reference to effect fine adjustment of the symmetrical heating of sample and reference.

15. A calorimeter as claimed in claim 14 wherein the inerception means comprises a rotatable butterfly stop.

16. A calorimeter as claimed in claim 15 wherein the stop comprises an elongated metal strip twisted to provide two portions in different planes.

17. A calorimeter as claimed in claim 16 wherein the temperature sensitive means comprises thermocouple circuits arranged to generate an EMF proportional to the temperature difference between sample and reference.

18. A calorimeter as claimed in claim 17 wherein the EMF from the thermocouple circuit is fed to a recording potentiometer coupled to the control heating means to effect variation of the radiation in the sense required to minimise the temperature difference of the sample and reference.

19. A calorimeter as claimed in claim 18 comprising a scanning control potentiometer coupled to the scanning heating means to effect a predetermined variation in the scanning heating.

20. A calorimeter as in claim 19 comprising means to control the scanning heating means to vary the EMF input to the scanning control potentiometer in accordance with a varying reference EMF.

References Cited

UNITED STATES PATENTS

| | | | |
|---|---|---|---|
| 1,398,217 | 11/1921 | Brown et al. | 219—347 |
| 3,263,484 | 8/1966 | Watson et al. | 73—15 |
| 3,275,874 | 9/1966 | Jennings | 313—183 |
| 3,339,398 | 10/1967 | Barrall et al. | 73—15 |

FOREIGN PATENTS 1,368,188   6/1964   France.

OTHER REFERENCES

V. Hogan and S. Gordon, Apparatus for Observing Physical Changes at Elevated Temp., vol. 32, Analytical Chem., 573–574, April 1960.

J. Hill and C. Murphy, Infrared Heating Applied to Diff. Thermal Analysis, vol. 31, Analytical Chem., 1443–1444, August 1959.

RICHARD C. QUEISSER, Primary Examiner

J. J. WHALEN, Assistant Examiner

U.S. Cl. X.R.

73—190